United States Patent
Hwang et al.

(10) Patent No.: US 6,903,868 B2
(45) Date of Patent: *Jun. 7, 2005

(54) WIDEBAND ERBIUM DOPED FIBER AMPLIFIER CAPABLE OF MINIMIZING BAND CROSSTALK

(75) Inventors: Seong-Taek Hwang, Pyongtaek-shi (KR); Kwan-Woong Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 215 days.

This patent is subject to a terminal disclaimer.

(21) Appl. No.: 10/299,488

(22) Filed: Nov. 19, 2002

(65) Prior Publication Data

US 2003/0161033 A1 Aug. 28, 2003

(30) Foreign Application Priority Data

Feb. 27, 2002 (KR) ........................................ 2002-10455

(51) Int. Cl.[7] ................................................ H01S 3/00
(52) U.S. Cl. ................................. 359/349; 359/341.1
(58) Field of Search ............................. 359/349, 341.1

(56) References Cited

U.S. PATENT DOCUMENTS 6,480,328 B2 * 11/2002 Shimojoh ................ 359/341.1
6,483,636 B1 * 11/2002 Sugaya et al. ............... 359/349
6,621,627 B2 * 9/2003 Willner et al. .............. 359/349
6,646,796 B2 * 11/2003 Song et al. .................. 359/349
6,674,570 B2 * 1/2004 Song et al. .................. 359/349

FOREIGN PATENT DOCUMENTS

JP          02003283021 A  * 10/2003

* cited by examiner

*Primary Examiner*—Mark Hellner
(74) *Attorney, Agent, or Firm*—Cha & Reiter, L.L.C.

(57) ABSTRACT

The inventive fiber amplifier comprises: (a) a first Er-doped fiber provided with a first light-pumping source via a first pump combiner to amplify input optical signals; (b) a second Er-doped fiber provided with a second light-pumping source via a second pump combiner to amplify input L-band optical signals; (c) a C/L splitter provided in the downstream of the first Er-doped fiber for splitting the optical signals into C- and L-bands, respectively, during passage through the C/L splitter; (d) a reflector for transmitting the L-band optical signals split in the C/L splitter toward the second Er-doped fiber and reflecting the transmitted L-band optical signals to flow back toward the second Er-doped fiber; (e) a circulator for introducing the L-band optical signals which are amplified after backward flow from the reflector toward another direction and preventing the backward flow of ASE generated during amplification toward the first Er-doped fiber; and, (f) a C/L combiner for combining the C-band optical signals split in the C/L splitter and the L-band optical signals introduced from the circulator.

8 Claims, 4 Drawing Sheets

WIDEBAND ERBIUM DOPED FIBER AMPLIFIER CAPABLE OF MINIMIZING BAND CROSSTALK

CLAIM OF PRIORITY

This application makes reference to and claims all benefits accruing under 35 U.S.C. Section 119 from an application entitled, "Wideband Erbium Doped Fiber Amplifier Capable of Minimizing Band Crosstalk", filed in the Korean Intellectual Property Office on Feb. 27, 2002 and there duly assigned Serial No. 2002-10455.

BACKGROUND OF THE INVENTION

1. Field of the Invention

The present invention relates to a fiber amplifier and, more particularly, an erbium (Er)-doped fiber amplifier capable of minimizing band crosstalk.

2. Description of the Related Art

Recently, the demand for a higher transmission bandwidth is increasing in an exponential fashion in the Wavelength-Division-Multiplexing (WDM) communication system. As such, many research efforts have been focused on a wideband transmission system using both the Conventional Band (C-band) and Long Band (L-band). The C-band transmission occurs at a wavelength band ranging from 1530 to 1560 nm, whereas the L-band transmission occurs at a wavelength band ranging from 1570 to 1610 nm. However, these wavelength band transmissions can vary according to the design implementation or characteristics of the Er-dope fibers.

An Erbium Doped Fiber Amplifier (EDFA) is widely used to amplify optical signals in most optical transmission systems. The Er-doped fiber amplifier is restricted in bandwidth, for example, the C-band and L-band have a bandwidth of about 30 nm, respectively. In contrast, a Raman amplifier or a Tellurite-based Er-doped fiber amplifier has a wider amplification bandwidth, such that both the C- and L-bands can be amplified at the same time. However, the Raman amplifier requires high pumping power. Meanwhile, the Tellurite-based Er-doped fiber amplifier is a new technology that has not been verified to be reliable. As such, the utilization of the wideband Er-doped fiber amplifiers has been improved to amplify both the C- and L-bands simultaneously using a conventional Silica-based Er-doped fiber amplifier. To this end, a C-band Er-doped fiber amplifier is typically combined in parallel with an L-band Er-doped fiber amplifier, as shown in FIG. 1.

Referring to FIG. 1, a conventional Er-doped fiber amplifier 10 comprises first and second Er-doped fiber amplifiers 118 and 124 that are connected in parallel to amplify the propagating optical signals, respectively. The first and second Er-doped fiber amplifiers 118 and 124 function to amplify optical signals in C- and L-bands, respectively. A C/L splitter 112 is provided at one end to split the optical signal inputs, and a C/L combiner 130 is provided at the other end to combine the split optical signals. Furthermore, the first and second isolators 110 and 132 are provided to the downstream of an input terminal and the upstream of an output terminal, respectively, to prevent the optical signals from propagating backward.

The C-band optical signals that are split through the C/L splitter 112 are amplified via the first Er-doped fiber 118 with pumped light from a 980 nm pumping laser diode 116 connected thereto via a pump combiner 114. The pumped light energizes Er ions from the ground state and the stimulated emission of the energized Er ions amplifies the C-band optical signals as they pass through the first Er-doped fiber 118. The amplified optical signals are combined in the C/L combiner 130.

Meanwhile, the L-band optical signals that are split via the C/L splitter 112 are amplified using the second Er-doped fiber 124 with pumped light from a forward 980 nm pumping laser diode 122 and a backward 1480 nm laser diode 128 connected to the second Er-doped fiber 124, respectively, via pump combiners 120 and 126. The pumped light energizes Er ions from the ground state and then the stimulated emission of the energized Er ions amplifies the L-band optical signals as they pass through the second Er-doped fiber 124. The amplified L-band optical signals are combined with the C-band optical signals in the C/L combiner 130 and the combined optical signals propagate to the output terminal.

However, the conventional Er-doped fiber amplifier has drawbacks in that it requires a large number of optical components as the respective Er-doped fiber amplifiers for the C- and L-bands are separately manufactured and connected in parallel configuration. As such, the manufacturing cost is high for the conventional amplifier. Moreover, the C/L splitter 112 with a large amount of insertion loss of approximately 0.7 dB is arranged in the upstream of the first and second Er-doped fibers 118 and 124 so as to worsen the noise coefficient of the fiber amplifier disadvantageously.

SUMMARY OF THE INVENTION

Accordingly, the present invention has been made to solve the foregoing problems by providing a wideband Er-doped fiber amplifier that is capable of minimizing crosstalk between the C- and L-bands, thereby expending the available wavelength range.

According to an aspect of the invention, a wideband Er-doped fiber amplifier includes: (a) a first Er-doped fiber provided with a first light-pumping source via a first pump combiner to amplify input optical signals; (b) a second Er-doped fiber provided with a second light-pumping source via a second pump combiner to amplify the input L-band optical signals; (c) a C/L splitter provided in the downstream of the first Er-doped fiber for splitting the optical signals into C- and L-bands, respectively, during passage through the C/L splitter; (d) a reflector for transmitting the L-band optical signals split in the C/L splitter toward the second Er-doped fiber and reflecting the transmitted L-band optical signals to flow back toward the second Er-doped fiber; (e) a circulator for introducing the L-band optical signals which are amplified after the backward flow from the reflector toward another direction and preventing backward flow of ASE generated during the amplification toward the first Er-doped fiber; and, (f) a C/L combiner for combining the C-band optical signals split in the C/L splitter and the L-band optical signals introduced from the circulator.

BRIEF DESCRIPTION OF THE DRAWINGS

The above features and other advantages of the present invention will be more clearly understood from the following detailed description taken in conjunction with the accompanying drawings, in which.

DETAILED DESCRIPTION OF THE PREFERRED EMBODIMENT

The following detailed description will present a preferred embodiment of the invention in reference to the accompanying drawings, in which well-known functions or constructions will not be described in detail as it would unnecessarily obscure the understanding of the invention.

Figure 1:
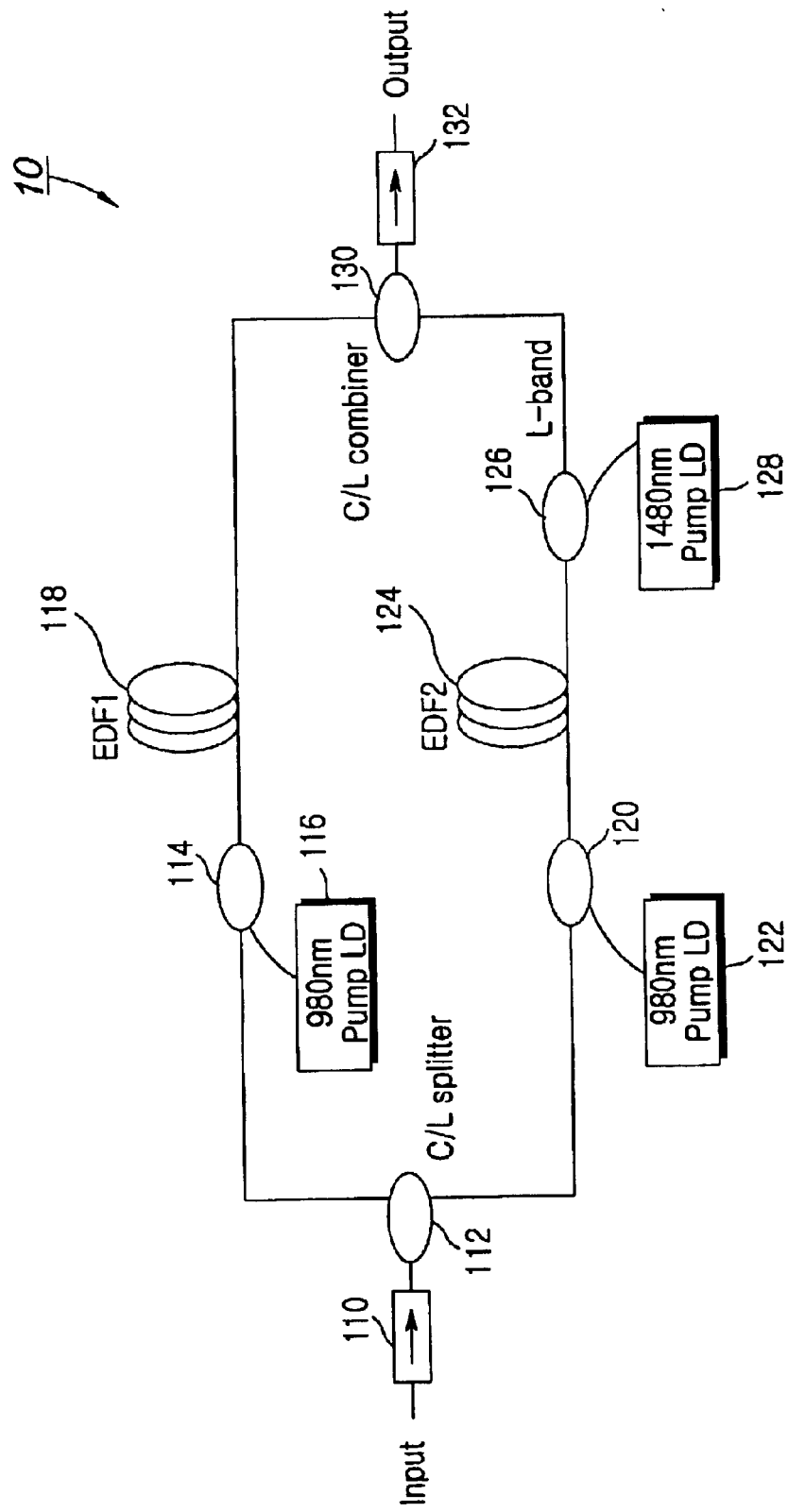
FIG. 1 is a block diagram of a fiber amplifier of the related art.
Figure 2:
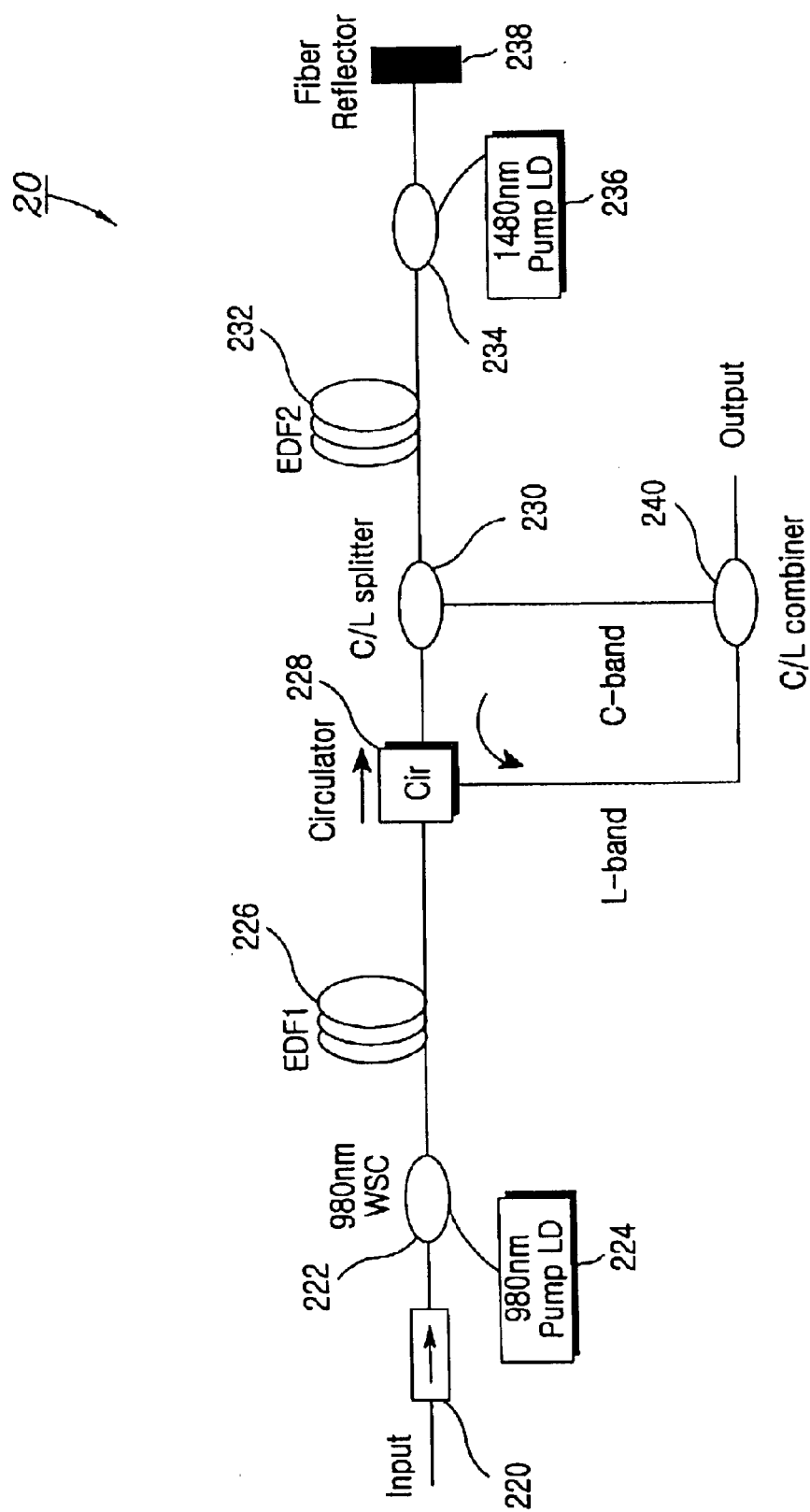
FIG. 2 is a block diagram of a wideband Er-doped fiber amplifier capable of minimizing band crosstalk according to a preferred embodiment of the invention; and, FIG. 3 is a graph showing the features of a C/L splitter adopted in the Er-doped fiber amplifier according to the preferred embodiment of the invention; and, FIG. 4. is a graph showing the gain features of the Er-doped fiber amplifier according to the preferred embodiment of the invention.

Referring to FIG. 2, a wideband Er-doped fiber amplifier 20 according to the embodiment of the present invention includes first and second amplifying units, wherein the first amplifying unit is defined by a first Er-doped fiber 226 being pumped by a 980 nm pumping laser diode, and a second amplifying unit is defined by a second Er-doped fiber 232 being pumped by a 1480 nm pumping laser diode 236. In the embodiment, the wideband Er-doped fiber amplifier 20 is configured to enable the L-band signal light to pass through the C/L splitter 230 twice and then combined at the C/L combiner 240 with a minimum amount of crosstalk between C- and L-bands.

Specifically, the first Er-doped fiber 226 is provided with a pumped light from a 980 nm pumping laser diode 224 via a 980 nm pump combiner 222 to amplify C-band and L-band optical signals, respectively. A circulator 228 is arranged in the downstream of the first Er-doped fiber 226 for introducing the reflected L-band optical signals traveling in a reverse direction and for preventing backward ASE from flowing back to the first Er-doped fiber 226 which tends to degrade the amplification efficiency. A C/L splitter 230 splits the optical signals amplified in the first Er-doped fiber 226 into the C- and L-bands. The second Er-doped fiber 232 is pumped by a 1480 nm pumping laser diode, which is connected thereto via a 1480 nm pump combiner 234. A reflector 238 re-transmits the ASE and the L-band optical signals amplified by the second Er-doped fiber 232 toward the second Er-doped fiber 232. The C/L combiner 240 combines the C-band optical signals transmitted from the C/L splitter 230 and the L-band optical signals transmitted from the circulator 228 to provide wideband optical signals. The optical fiber amplifier is further provided with an isolator 220 for blocking the backward propagation of the optical signals.

The circulator 228 has three ports: the first one is an input terminal for the amplified C- and L-band optical signals; the second one is an output terminal for the C- and L-band optical signals; and, the third one is an output terminal in use for combining the L-band signals re-transmitted by the reflector 238 to the backward direction into the C/L combiner 240. The C/L splitter 230 has three ports: the first one is an input terminal on which the C- and L-band optical signals are incident; the second one is an output terminal from which the split L-band optical signals propagate toward the second Er-doped fiber 232; and, the third one is an output terminal from which the split C-band optical signals propagate toward the C/L combiner 240. Further, the C/L combiner 240 has three ports: the first one is an input terminal for the C-band optical signals which are split in the C/L splitter 230; the second one is an input terminal for the L-band optical signals which are emitted from the circulator 228; and, the third one is an output terminal from which the combined C- and L-band optical signals are emitted.

The above-mentioned C-band ranges from 1530 to 1560 nm, and the L-band ranges from 1570 to 1610 nm. However, these band ranges are variable according to the embodiment and thus can be modified according to amplifier design or Er-doped fibers.

Hereinafter, a description will be made relating to the operation of the wideband fiber amplifier 20 according to the configuration shown in FIG. 2.

In operation, the wideband-fiber amplifier 20 of the invention amplifies the C- and L-band optical signals as they pass through the first Er-doped fiber 226 and then only the L-band optical signals pass through the second Er-doped fiber 232. The first Er-doped fiber 226 uses the 980 nm pumping laser diode 224 in a forward direction, and the second Er-doped fiber 232 uses the 1480 nm pumping laser diode 236 in a reverse direction.

The first Er-doped fiber 226 is provided with the 980 nm pumped light via the 980 nm pump combiner 222 to amplify optical signals, including the C- and L-band optical signals, which propagate in a forward direction.

The C- and L-band optical signals amplified during the passage through the first Er-doped fiber 226 pass through the circulator 228 and then split into the C- and L-bands in the C/L splitter 230. The split L-band optical signals are applied toward the second Er-doped fiber 232 in a forward direction, and the split C-band optical signals propagate toward the C/L combiner 240. Then, the L-band optical signals amplified during passage through the second Er-doped fiber 232 are reflected back by the reflector 238 and re-transmitted toward the second Er-doped fiber 232 in a reverse direction. Note that the amplified L-band optical signals are totally reflected from the reflector 238.

With continued reference to FIG. 2, the L-band optical signals are amplified by the pumped light, which is provided from the 1480 nm pumping laser diode 236 via the 1480 nm pump combiner 234, then propagate toward the C/L combiner 240 from the circulator 228, where the L-band optical signals are combined with the C-band optical signals and then finally outputted.

Note that the 980 nm pumping laser diode 224 functioning as a light-pumping source of the first Er-doped fiber 226 is used to lower the noise coefficient of the amplifier, whereas the 1480 nm pumping laser diode 236 functioning as an light-amplifying source of the second Er-doped fiber 232 is used to enhance the output of the amplifier. Preferably, the circulator 228 functions to prevent the backward ASE used in the Er-doped fiber amplifier that may flow back to the first Er-doped fiber 226 to degrade the efficiency of the amplifier. As a result, the wideband Er-doped fiber amplifier of the invention is configured so that the L-band signals pass through the C/L splitter 230 twice and then combine again in the C/L combiner 240 in order to reduce any crosstalk wavelength between the C- and L-band signals.

Figure 3:
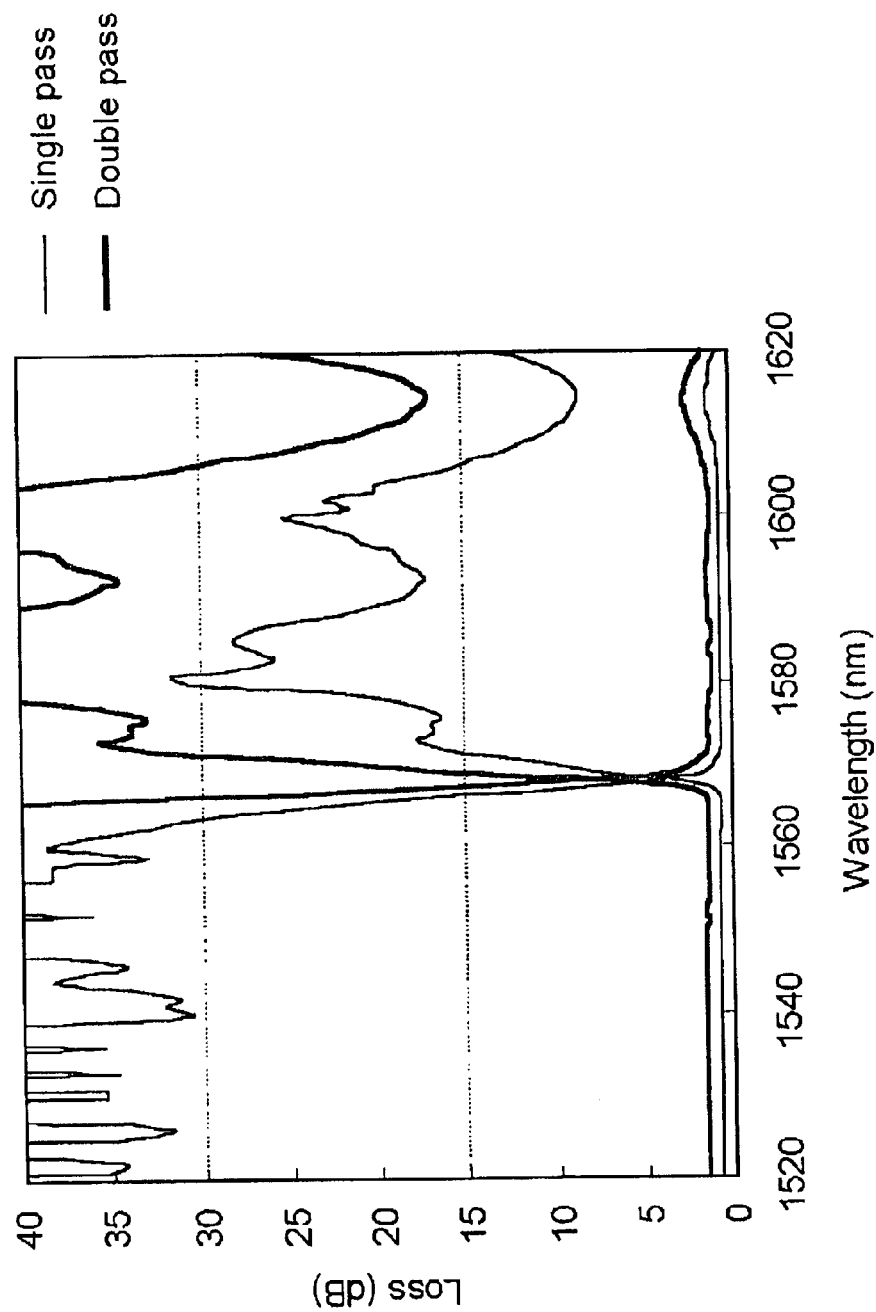
Figure 4:
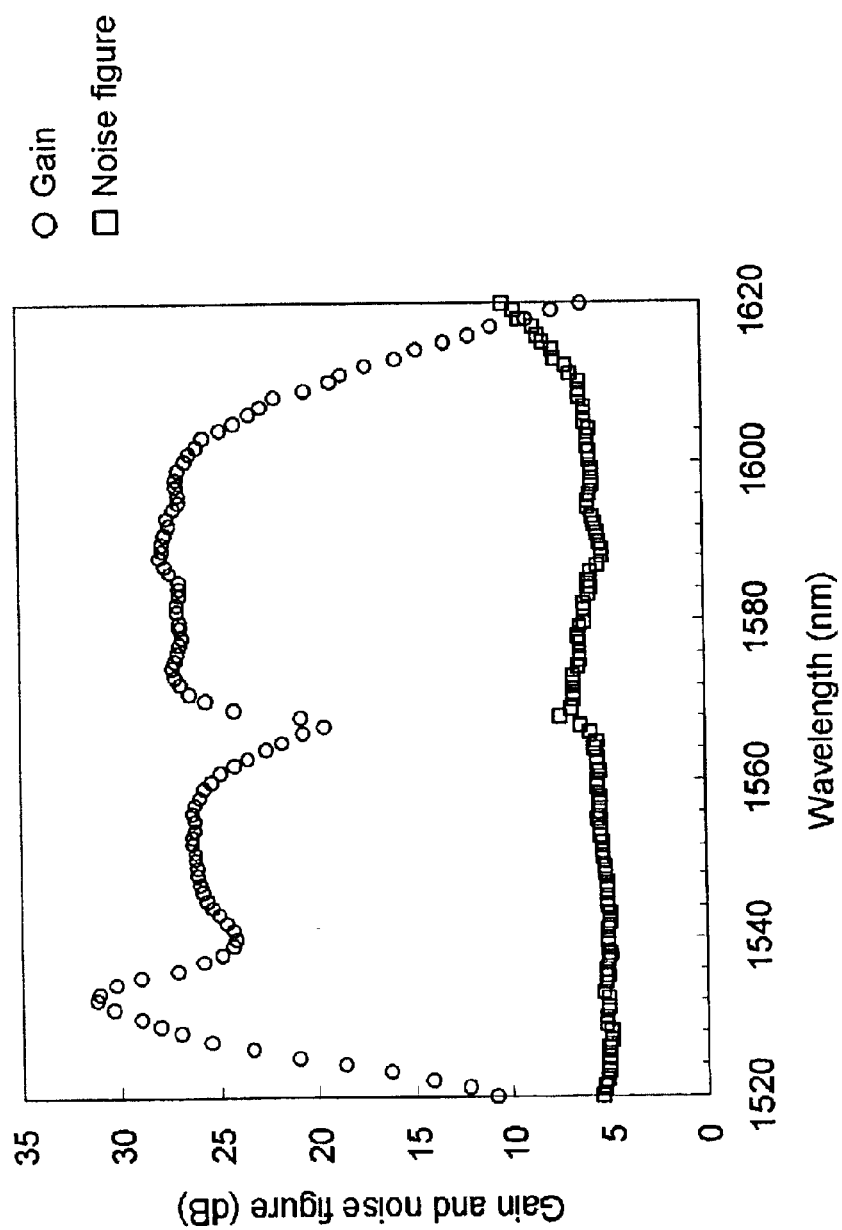

Referring to FIGS. 3 and 4, in a range where the C/L splitter 230 used in the wideband Er-doped fiber amplifier 20 of the invention has crosstalk of 15 dB, the construction making the L-band optical signals pass through the C/L splitter 230 twice reduces 15 dB crosstalk wavelength range from 5 nm to 2 nm. In a range where the C/L splitter 230 has crosstalk of 30 dB, it can be seen that the inventive construction reduces 30 dB crosstalk wavelength range from 16 nm to 5 nm.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. A wideband Er-doped fiber amplifier comprising:
   (a) a first Er-doped fiber provided with a first light-pumping source via a first pump combiner to amplify input optical signals;
   (b) a second Er-doped fiber provided with a second light-pumping source via a second pump combiner to amplify input L-band optical signals;
   (c) a C/L splitter disposed between the first Er-doped fiber and the second Er-doped fiber for splitting optical signals passing there-through into C- and L-bands;
   (d) a reflector for reflecting the L-band optical signals outputted from the second Er-doped fiber back toward the second Er-doped fiber;
   (e) a circulator disposed between the first Er-doped fiber and the C/L splitter for forwarding the reflected L-band output signals received therein to another direction and for preventing backward flow of ASE generated by the first Er-doped fiber; and,
   (f) a C/L combiner for combining the C-band optical signal outputted from the C/L splitter and the reflected L-band optical signals forwarded by the circulator.

2. The wideband Er-doped fiber amplifier according to claim 1, wherein the first light-pumping source comprises a forward 980 nm pumping laser diode.

3. The wideband Er-doped fiber amplifier according to claim 1, wherein the second light-pumping source comprises a backward 1480 nm pumping laser diode.

4. The wideband Er-doped fiber amplifier according to claim 1, wherein the first tunable combiner comprises a 980 nm pump combiner, and the second tunable combiner comprises a 1480 nm pump combiner.

5. The wideband Er-doped fiber amplifier according to claim 1, wherein the circulator comprises three ports, wherein a first port is an input terminal for the C- and L-band optical signals amplified through the first Er-dope fiber; a second port is an output terminal through which the C- and L-band optical signals are outputted; and, a third port is an output terminal for transmitting the reflected L-band signals.

6. The wideband Er-doped fiber amplifier according to claim 1, wherein the C/L splitter has three ports, wherein a first port is an input terminal into which the C- and L-band optical signals are inputted; a second port is an output terminal from which the split L-band optical signals are applied to the second Er-doped fiber; and, a third port is an output terminal from which the split C-band optical signals are transmitted toward the C/L combiner.

7. The wideband Er-doped fiber amplifier according to claim 1, wherein the C-band ranges from 1530 to 1560 nm.

8. The wideband Er-doped fiber amplifier according to claim 1, wherein the L-band ranges from 1570 to 1610 nm.

* * * * *